No. 772,164.

Patented October 11, 1904.

UNITED STATES PATENT OFFICE.

OTTO MASSENEZ, OF WIESBADEN, GERMANY.

PROCESS OF DECHROMIZING IRON.

SPECIFICATION forming part of Letters Patent No. 772,164, dated October 11, 1904.

Application filed February 6, 1904. Serial No. 192,443. (No specimens.)

*To all whom it may concern:*

Be it known that I, OTTO MASSENEZ, doctor of laws, a subject of the King of Prussia, Emperor of Germany, and whose post-office address is No. 10 Humboldtstrasse, Wiesbaden, in the Kingdom of Prussia, German Empire, have invented a new and useful Process of Dechromizing Iron; and I do hereby declare that the following is a full, clear, and exact description of my invention, which will enable others skilled in the art to which it appertains to make and use the same.

The manufacture of malleable iron from iron high in carbon and chromium—that is to say, more than one per cent. of chromium—is rendered a very difficult process by the fact that the slag which forms under the oxidizing actions upon which the methods of steel-making are based is rendered so stiff and deprived of fluidity by the entrance into it of large quantities of oxid of chromium that it is not possible to carry the process through. This formation of an extremely thick slag deprived of fluidity prevents, moreover, the conversion of charges rich in chromium into malleable iron by the open-hearth furnace. Already during the operations of melting down the metal charged into the open-hearth furnace or, if molten iron is used, soon after its introduction into the furnace the metal becomes covered by a layer of slag, which is so stiff that the oxidizing action of the flame on the metal is prevented; nor is it possible to raise the bath to the high temperature, which is indispensable for the elimination of the carbon contained in the metal and its conversion into steel.

As under the working conditions of the process the chromium contained in the metal has the property of being so rapidly oxidized that after a short period a large percentage of the amount of chromium originally contained in the metal has passed into the slag in the form of oxid of chromium, the effect above described will occur in the beginning of the melting operation, and in attempting to work high chromium heats said effects become so accentuated that it is impossible to finish the heats, the removal of the slag from the furnace, and thereby the restitution of the action of the flame on the bath, both as regards oxidation and heating, being rendered impracticable owing to extreme stiffness of the slag. In my prior United States Letters Patent, No. 754,154, dated March 8, 1904, I have disclosed a way how to overcome this difficulty by means of certain fluxes—that is to say, by means of chlorids and fluorids of alkaline and alkaline-earth metals, carbonates of the alkaline metals, and mixtures of these compounds. Now I have since found that the use of said fluxes can be largely reduced and may even be wholly dispensed with by proceeding in such a manner that in the beginning of the operation where, as mentioned above, the greatest part of the chromium contained in the metal passes into the slag as chromic oxid, so large a quantity of slag is caused to form that the percentage of chromic oxid of the chromiferous slag then resulting does not exceed thirteen per cent., or thereabout. With this maximum percentage of chromic oxid the slag will be found to have a degree of fluidity which enables it to be wholly or partly removed from the furnace when required or desirable, whereas a noticeably higher percentage of chromium oxid will damage the fluidity of the slag to a degree which renders it unfit for my purpose. In order to remove the slag from the furnace with greater ease, it is, however, advisable to increase the quantity of the slag to such an extent that the oxid of chromium contained in it is even less than thirteen per cent., and my process will be carried through without any difficulty if in the beginning of the operation the amount of slag is increased so considerably that the slag does not contain more than nine per cent. of oxid of chromium. The beneficial results of my improved process as compared with my said prior process are that, on the one hand, the manufacture is rendered by far less costly as regards the dechromizing step, and, on the other hand, the lining of the furnace is guaranteed a by far longer life than allowed by my former process. The amount of slag which has to be formed in each case depends on the percentage of chromium contained in the charge, on the weight of the charge, and on the character of the slag formed. In carrying out my process the aim must be to form a slag which by itself, if no chromic oxid were contained in it, would be easily fusible.

In order to obtain the quantity of slag which is necessary for sufficiently thinning or attenuating the amount of chromic oxid contained in the slag formed at the beginning of the melting operation, which quantity is very great with charges containing a high amount of chromium—say over two per cent.—any substances may be used which by themselves are capable of forming easily-fusible slags if mixed together in proper proportions. Moreover, slags may be used which have resulted from other processes, provided they be sufficiently fusible or fluid in the molten state and do not contain substances liable to be taken up by the metal, so as to introduce into the steel impurities obnoxious to its quality. Such slags offer the advantage that they may be introduced into the furnace already in a molten condition. In any case the selection of constituents for forming the slag should be made with a view to form the necessary large amount of slag at the least possible expense. For instance, a slag well adapted for my present purpose will be obtained by applying a mixture of lime, iron ore, and basic open-hearth slag—i.e., slag which has been obtained by working hematite pig-iron or scrap on a basic open hearth—or a mixture composed of preferably equal parts of lime and mill scale or ore.

As regards the carrying out of my improved process, this can be done in different ways, especially as regards the period at which the operation of increasing the quantity of slag is performed. For instance, the amount of slag required may be wholly or partially produced in the furnace before the metal is introduced. By this way of proceeding the advantages are obtained that the formation of a prejudicially stiff slag is avoided from the very beginning, and, moreover, the length of time required for the heat is reduced, or the necessary quantity of slag may be formed during the melting of the charge or immediately after by subsequent additions of slag-forming constituents. In cases where removal of the slag becomes necessary or desirable, especially when working pig-iron with more than one and a half per cent. of chromium, I by preference proceed in such a way that I remove the slag from the furnace at intervals, increasing again after each removal the quantity of the remaining slag by further additions of slag-forming constituents. I prefer to carry out my improved process in furnaces which are fitted with a special outlet for the slag or in tilting furnaces, so as to enable the slag to be readily removed as completely as may be desired.

Having now explained the essential features which distinguish my process from the process of working ordinary heats in the open hearth, I give as an example a detailed description of working in a basic lined open-hearth furnace provided with a slag-notch a twenty-ton charge, the metal being supposed to contain over two per cent. of chromium. Before the metal is charged, either cold or molten, I introduce into the furnace a mixture of lime, basic slag, and hematite ore, about three tons of each. This mixture is well heated until it becomes wholly or partly melted. The metal is then charged, either cold or molten, and as much heat as possible is put on the furnace. About one hour after the charge is completely molten, or if liquid pig-iron has been charged, about one hour after the pig-iron has been poured in the furnace, the outlet for the slag is opened and as much slag as possible removed from the furnace. At this period of the process the metal will already be freed from a great part of the chromium originally contained in it—for instance, if the chromium in the pig-iron was three per cent. about one and a half to two per cent. will have disappeared. The outlet for the slag is then reclosed, and the quantity of slag is again increased by additions of iron ore, fluor-spar, lime, and basic slag. This new slag is ready again for tapping in about one hour and then run off as before. In the same way a third slag and further slags are formed and run off, according to the amount of chromium originally contained in the pig-iron. When nearly all the chromium has thus been eliminated from the metal, which generally is the case while the metal still retains about two per cent. of carbon, only so much slag is left in the furnace as will suffice to prevent a too rapid oxidation of the now practically dechromized metal by the flame. By additions of ore and the oxidizing effect of the flame the carbon in the bath is now reduced to the desired amount and the steel deoxidized and tapped as in working ordinary heats. The carbon may also be reduced below the amount which is desired in the finished steel, in which case the metal has to be recarburized either by additions of spiegeleisen, ferromanganese, pig-iron, or solid carbon in the usual way. My process is also applicable in general for purifying pig-iron high in chromium (with more than one per cent. of chromium) from chromium without converting the said pig-iron into steel in the same furnace.

What I claim as my invention is—

1. The process of dechromizing iron high in chromium, which essentially consists in exposing the metal to an oxidizing-flame in the open-hearth furnace, absorbing the chromic oxid formed by a slag which is easily fusible by itself and proportioning the amount of such slag so that a chromiferous slag containing at most thirteen per cent. of chromic oxid is formed; substantially as and for the purpose stated.

2. The process of dechromizing iron high in chromium which essentially consists in exposing the metal to an oxidizing-flame in the open-hearth furnace, absorbing the chromic oxid formed by a slag which is easily fusible by itself, proportioning the amount of such slag so that a chromiferous slag containing at most thirteen per cent. of chromic oxid is formed, removing at intervals part of the chromiferous slag and substituting therefor easily-fusible slag, substantially as and for the purpose stated.

3. The process of dechromizing iron high in chromium, which essentially consists in exposing the metal to an oxidizing-flame in the open-hearth furnace, absorbing the chromic oxid formed by a slag produced from a mixture of lime, iron ore and basic open-hearth slag, and proportioning the amount of such slag so that a chromiferous slag containing at most thirteen per cent. of chromic oxid is formed; substantially as and for the purpose stated.

4. The process of dechromizing iron high in chromium which essentially consists in exposing the metal to an oxidizing-flame in the open-hearth furnace, absorbing the chromic oxid formed by a slag produced from a mixture of lime, iron ore and basic open-hearth slag, proportioning the amount of such slag so that a chromiferous slag containing at most thirteen per cent. of chromic oxid is formed, removing at intervals part of the chromiferous slag formed and substituting therefor a quantity of said slag-forming constituents, substantially as and for the purpose stated.

5. The process of dechromizing iron high in chromium, which essentially consists in providing in the open-hearth furnace a slag which is easily fusible by itself, adding the metal and acting upon the same by an oxidizing-flame, the amount of said slag being so proportioned that a chromiferous slag is produced which contains at most thirteen per cent. of chromic oxid, substantially as and for the purpose stated.

6. The process of dechromizing iron high in chromium which essentially consists in providing in the open-hearth furnace a slag which is easily fusible by itself, and the amount of which is so proportioned that by its contact with the chromiferous iron to be treated a chromiferous slag is obtained which contains at most thirteen per cent. of chromic oxid, adding the metal, acting upon the same by an oxidizing-flame, removing at intervals a portion of the chromiferous slag formed and substituting therefor a quantity of easily-fusible slag, substantially as and for the purpose stated.

7. The process of dechromizing iron high in chromium which essentially consists in charging an open-hearth furnace with a mixture of lime, iron ore and basic open-hearth slag, as the constituents for forming an easily-fusible dechromizing slag, proportioning the amount of this charge so that the chromiferous slag forming when in contact with the metal to be treated will at most contain thirteen per cent. of chromic oxid, heating the mixture, adding the metal, acting upon the same with an oxidizing-flame, removing at intervals a portion of the chromiferous slag formed and substituting therefor a fresh quantity of a mixture of lime, iron ore and basic open-hearth slag, substantially as and for the purpose stated.

In testimony whereof I have hereunto set my hand in presence of two subscribing witnesses.

OTTO MASSENEZ.

Witnesses:
 HEINRICH JACOBS,
 WILHELM QUITZDORFF.